(12) United States Patent
Ellis

(10) Patent No.: US 6,464,005 B1
(45) Date of Patent: Oct. 15, 2002

(54) REMEDIATION METHOD

(76) Inventor: Mark T. Ellis, 9792 W. 8800 North, Lehi, UT (US) 84043

( * ) Notice: Subject to any disclaimer, the term of this patent is extended or adjusted under 35 U.S.C. 154(b) by 0 days.

(21) Appl. No.: 09/853,346

(22) Filed: May 10, 2001

(51) Int. Cl.[7] .................................................. B09C 1/10
(52) U.S. Cl. ............... 166/268; 405/128.15; 405/128.2; 405/128.25; 405/128.3; 405/128.45
(58) Field of Search .................................. 166/268, 245; 405/128.15, 128.2, 128.25, 128.3, 128.45

(56) References Cited

U.S. PATENT DOCUMENTS

| | | | |
|---|---|---|---|
| 3,846,290 A | | 11/1974 | Raymond |
| 4,730,672 A | * | 3/1988 | Payne |
| 4,832,122 A | * | 5/1989 | Corey et al. |
| 5,133,625 A | * | 7/1992 | Albergo et al. ............. 111/118 |
| 5,221,159 A | | 6/1993 | Billings et al. |
| 5,277,518 A | * | 1/1994 | Billings et al. |
| 5,398,757 A | | 3/1995 | Corte et al. |
| 5,464,309 A | * | 11/1995 | Mancini et al. |
| 5,472,294 A | * | 12/1995 | Billings et al. |
| 5,575,589 A | | 11/1996 | Suthersan |
| 5,584,605 A | * | 12/1996 | Beard et al. |
| 5,611,402 A | | 3/1997 | Welsh |
| 5,622,450 A | * | 4/1997 | Grant, Jr. |
| 5,623,992 A | * | 4/1997 | Shaw |
| 5,690,173 A | * | 11/1997 | Abdul et al. |
| 5,829,918 A | * | 11/1998 | Chintis |
| 5,893,680 A | | 4/1999 | Lowry et al. |
| 6,027,284 A | * | 2/2000 | Prasher et al. |

FOREIGN PATENT DOCUMENTS

JP         7-136631    *   5/1995

* cited by examiner

Primary Examiner—Heather Shackelford
Assistant Examiner—Katherine W Mitchell
(74) Attorney, Agent, or Firm—Mallinckrodt & Mallinckrodt; Robert R. Mallinckrodt (57) ABSTRACT

A method of remediating a site of earth and groundwater contamination includes the steps of drilling at least one injection well, and preferably a plurality of injection wells, into the groundwater in a contaminated area. At least one, and preferably a plurality of extraction wells, are drilled into the earth above the groundwater, the vadose zone, in the contaminated area. The surface of the earth above the contaminated area is sealed, such as by a layer of concrete, asphalt, or plastic sheeting. Air and nutrients are injected into the contaminated area through the injection wells. The air is injected on a substantially continuous basis while the nutrients are injected on a batch basis. Air and vapor is extracted on a substantially continuous basis from the contaminated area by the extraction wells, which may be either vertically or horizontally positioned.

25 Claims, 4 Drawing Sheets

REMEDIATION METHOD

BACKGROUND OF THE INVENTION

1. Field

The invention is in the field of remediation of earth and groundwater contamination, particularly petroleum contamination.

2. State of the Art

An evolution of processes has occurred in the remediation industry over the years. Early in the history of hazardous waste and petroleum waste clean ups, methods were primitive, involving mostly what is referred to as "dig and haul" technology. This method involves digging contaminated soil vertically and laterally until the contamination that can be detected has been removed. This method is limited in its effectiveness due to the extreme amount of site disturbance, high cost, drastic impact on the use of the property at the site, severe safety problems, and a tendency to miss contaminated pockets.

Later developments of remediation technologies include mechanical treatment methods and biological methods. Mechanical methods include soil washing, high volume sparging (air injection), vapor extraction, pump and treat, and surfactant treatment. These methods rely upon manipulation of physical properties to force contamination out of the soil or groundwater. These methods have a wide range of effectiveness; some are expensive and some take a long period of time to reach an asymptotic treatment level. At least one method, surfactant treatment, may result in masking the contamination rather than removing it.

Biological methods come and go, partly because the processes of biological treatments are incompletely followed and partly because biological processes are frequently patchy in their effectiveness. Cultivated bacteria injections, bioventing, nutrient injection, and biosparging are intended to use natural biological processes with either cultivated biota or naturally occurring microbes to degrade contaminants through metabolism. spreading in the contaminated media. The biofilm tends to reduce groundwater and gas movement, effectively reducing remedial action. Further, there are generally limits established by states for the concentration of nitrate in groundwaters, requiring in many states that the concentration of nitrate in groundwater be less than 10 mg/L. However, nitrates have been shown to degrade petroleum from 3 mg/L to nondetectable concentrations in as short a time as one month (Mihelcic, James R. and Richard G. Luthy, *Microbial Degradation of Acenaphthene and Naphthalene Under Denitrification Conditions in Soil-Water Systems, Applied and Environmental Microbiology*, May 1988, pp. 1188–1198).

The movement of any injected air through water is referred to as sparging. Biosparging is the process of injecting air, under pressure into a subsurface aquifer for the purpose of oxygenating the groundwater.

Biosparging accelerates metabolism of petroleum in groundwater and soil. Aerobic metabolism is a more rapid process of petroleum degradation than is anaerobic metabolism. Biosparging infuses oxygen rapidly into the groundwater, at a rate of about 8 pounds of oxygen dissolved into the groundwater each hour. To metabolize one mole of hexane, for example, requires 9.5 moles of oxygen. Research has found that one-fourth of the available carbon is used to produce microbial mass (Wetzel, Robert G., *Limnology*, page 640, W. B. Saunders Company, West Washington Square, Philadelphia, Pa. 19105). The other three-fourths of the available carbon is excreted as carbon dioxide. Biological systems must avoid the buildup of $CO_2$ or aerobic metabolism is overwhelmed and shuts down. Metabolism of hydrocarbons in the presence of oxygen takes place in the soil, just as in the groundwater.

While the various processes described are effective under certain circumstances and conditions, they all leave something to be desired in terms of results and none are universally applicable to varying conditions of petroleum soil and groundwater contamination.

Nutrients are essential ingredients for all biological systems. If the biological system is being cultivated to consume hyrdocarbons, nutrient levels must be maintained for the microflora to thrive. Nutrient injection has increased in popularity, accelerated by the research work performed by Albert Venosa, et al. at Delaware Bay, reported at *Bioremediation of an Experimental Oil Spill on the Shoreline of Delaware Bay, Environmental Science and Technology*, Cincinnati, Ohio; Vol. 30, No. 5, pp. 1764–1775, 1996. Venosa's work was in open water and did not actually inject nutrients, but his methods and conclusions showed that nitrate aggressively degrades hydrocarbons. When oxygen is depleted, there are other electron acceptors that will degrade hydrocarbons, including nitrate, sulfate, manganese and iron. Mihelcic and Luthy reported at *Microbial Degradation of Acenaphthene and Naphthalene under Denitrification Conditions in Soil-Water Systems, Applied and Environmental Microbiology*, May 1988, pp. 1188–1198, that 0.8 moles of nitrate were required for each mole of carbon dioxide produced when petroleum is metabolized. Nitrate and other forms of lithogenic nitrogen are found in low concentrations in natural water. Nitrate in natural groundwater which is not affected by human activities is usually less than 1 mg/L. Ideal ratios for carbon:nitrate:phosphate concentrations are documented for aquatic macroflora. Nutrient ratios for aquatic macrophytes and algae are reported to be 40:7:1 (Wetzel, Robert G., *Limnology*, page 640, W. B. Saunders Company, West Washington Square, Philadelphia, Pa. 19105). One of the inventors has been told by USGS, Denver office personnel, that the ideal carbon:nitrate:phosphate ratio in soil is 160:1:0.08.

Nutrient injection is subject to at least two major drawbacks. First, injected nutrients do not spread well without a dispersal agent and nutrient injection methods require a consistent distribution system. The second drawback is that nutrients do not survive long in the environment, being readily attacked by a host of biological systems in the environment. Nitrates dosed into a contaminant zone in high concentrations tend to develop biofilms in the soil that can trap the nutrients and prevent them from To try to overcome problems with particular methods, various combinations of methods have been suggested.

U.S. Pat. No. 5,575,589 discloses a remediation system for groundwater wherein a trench is dug across the natural flow stream of the contaminated groundwater. A perforated injection pipe is laid in the trench with porous material filling the trench above the injection pipe to a location just above the top level of the water table. A perforated extraction pipe is laid in the trench above the top of the water table above the injection pipe and the trench is back filled. The top of the trench is sealed with air impervious material such as clay or concrete.

Air is injected through the injection pipe into the water flowing through the porous material. The air bubbles through the water, apparently remaining substantially in the porous material of the trench and is collected by the extraction pipe which is maintained under vacuum. The patent also teaches that ammonium orthophosphate may be trickled into the trench to biodegrade the biodegradable contaminants.

U.S. Pat. No. 5,221,159 discloses a remediation system with bore holes extending down into the groundwater aquifer through which oxygen-containing gas is injected into the water to stimulate microorganism activity. Extraction wells extend into the vadose zone above the water aquifer. Vacuum in the extraction wells draw injected gas and volatile contaminants out of the vadose zone.

U.S. Pat. No. 3,846,290 discloses an injection well for injecting nutrients and air into contaminated groundwater and an extraction well to extract treated water from the groundwater. The water extracted causes flow of the air and nutrients between the injection well and the extraction well.

U.S. Pat. No. 5,398,757 discloses a remediation system wherein a fluid (liquid or gas) is injected into the bottom of a bore hole from where it flows into and through the contaminated material, picking up contaminants, and then flows back into the bore hole above the contaminated area where it is extracted by a vacuum.

U.S. Pat. No. 5,611,402 discloses one or more bore holes through the contaminated area. A perforated pipe is inserted into the bore hole and is connected to a source of vacuum to draw air, liquid, and vapor out of the contaminated area. The earth surface over the contaminated area is sealed such as with plastic sheeting to prevent air from above the surface being drawn down into the vacuum collection pipe.

U.S. Pat. No. 5,893,680 discloses sealing the surface of the earth above a contaminated site and letting the natural atmospheric pressure changes expel gases, through the earth, from the site. The sealed surface minimizes flow of air into the earth during periods of high pressure while allowing free flow of gas through a one-way valve from the earth during periods of low pressure.

SUMMARY OF THE INVENTION

According to the invention, several prior art methods are combined into an integrated method of remediation which the inventors have found to be substantially universally applicable to remediation of petroleum contaminated soil and groundwater. The several methods combined are each designed to alleviate the problems associated with the other methods used. The combination produces an overall remediation method that does not experience the problems experienced with use of the individual methods or other combination of methods.

The method of the invention involves drilling at least one injection well into the underground water in the contaminated area, placing at least one extraction conduit into the earth above the water in the contaminated area, and sealing the surface of the earth above the contaminated area and the extraction conduit. Nutrient is injected into the contaminated area through the injection well as is pressurized air. A vacuum is created in the extraction conduit to withdraw gas and vapor from the earth above the water in the contaminated zone. This combines biosparging, nutrient injection, air injection, air and vapor extraction, and surface sealing.

As indicated above, metabolism of petroleum in groundwater and soil produces $CO_2$. However, the build up of $CO_2$ poisons the aerobic biota, regardless of the available oxygen and has an adverse affect on further aerobic metabolism. While biosparging injects air with oxygen into the contaminated area to increase the aerobic metabolism, biosparging places a positive pressure in all of the subsurface environment, including the soil, which results in a buildup of $CO_2$. If a gas removal mechanism is provided in the metabolic zone, $CO_2$ and other chemicals with a relatively high vapor pressure such as light end hydrocarbons (light end wastes) are stimulated to move away from the high pressure zone to areas of low pressure and such light end hydrocarbons and $CO_2$ can be removed from the ecosystem. To facilitate $CO_2$ removal, biosparging should be accompanied by a vapor extraction system or bioventing. Biosparging units inject air into the subsurface, but do not exceed the soil handling capacity if there is an accompanying vapor extraction system. In a typical system of the invention, the vapor extracted from the contamination area will be anywhere from about twice to about ten times the volume of air injected into the contamination area.

To make the extraction system effective, extraction needs to be directed to the contaminant volatiles in the contaminated area and to the air injected into the contaminated area. In order to maintain the equilibrium of pressure (negative) and air movement in the soil, the vadose zone must be contained. It has been found that air can best be contained if the surface of the ground above the remediation work is sealed. With the surface sealed, air from the biosparger has to move into the vapor extraction system. With the surface sealed, air drawn into the vapor extraction portion of the system is more likely to originate from the biosparger and from the contaminated area than from the ground surface. The containment of the air in the vadose zone means that the cycle of oxygen infusion to the contaminated groundwater and soil is completed by withdrawal of volatile hydrocarbons and products of metabolism. Short circuiting of surface air into the vadose zone interrupts the flow of $CO_2$ and hydrocarbons out of the contaminated zone, thereby slowing the metabolism of the hydrocarbons and lengthening the remediation process.

THE DRAWINGS

The best mode currently contemplated for carrying out the invention is illustrated in the accompanying drawings, in which.

DETAILED DESCRIPTION OF THE ILLUSTRATED EMBODIMENT

The remediation method of the invention involves the combination of air and nutrient injection into an area of groundwater and soil contaminated with hydrocarbons coupled with vapor extraction from the area to maintain a negative pressure in the area, and sealing of the surface of the area to prevent direct flow of air from the surface into the negative pressure area. The method includes drilling at least one well into the underground water in the contamination area, and usually a plurality of wells positioned and spaced with respect to the contaminated area and the groundwater flow in the area so as to promote flow and spread of injected air in the groundwater and soil and injected nutrients in the soil and groundwater throughout the area of contamination. This generally will involve placing a plurality of injection wells at least just outside the area of contamination in the upstream direction of groundwater flow through the area of contamination as well as at various locations in the area of contamination so that injected air and nutrients will spread throughout the area of contamination. It is presently preferred that wells completely surround the area of contamination to help prevent any shift or movement of the contamination during treatment.

Figure 1:
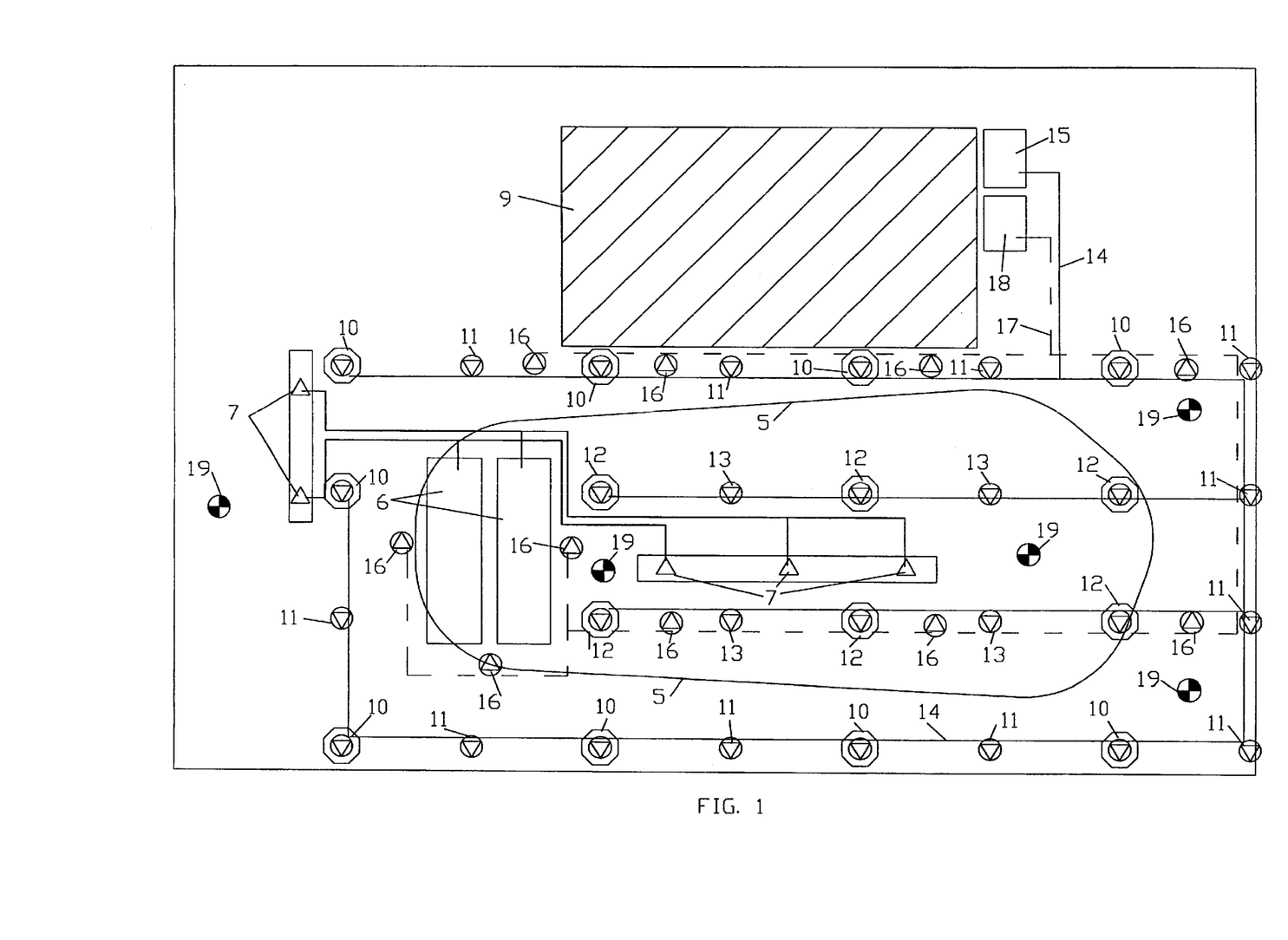
FIG. 1, is a schematic layout showing a contaminated area to be remediated, placement of injection wells, placement of extraction wells, and placement of monitor wells for practice of the invention.

FIG. 1 shows a contaminated area 5 extending from underground petroleum storage tanks 6 at a gasoline station having fuel dispensing pumps 7 in dispensing islands 8 and a service and/or convenience store building 9. A leak in one of the storage tanks 6 has created the contaminated area 5 which extends from the tanks in the direction of groundwater flow. Such an area is sometimes referred to as an oil spill or petroleum spill. While the contaminated area shown in FIG. 1 for illustration purposes is relatively small, and such spills are common at gasoline stations, current EPA regulations require its cleanup. As shown in FIG. 1, a plurality of injection wells 10 and 11 are positioned around the outside of the contaminated area 5 with additional injection wells 12 and 13 spaced in the contaminated area. It has been found that for effective biosparging, air injection into the groundwater should be at a relatively low rate of between about five and forty cubic feet per hour (CFH)(0.083 and 0.67 cubic feet per minute), and preferably between about twenty and forty CFH. This is contrasted with commonly used sparging rates today of one or more cubic feet per minute (CFM). This higher rate can easily result in channeling in soil and water. Channeling seriously interferes with the spread of oxygen throughout the groundwater and soil. The relatively slow rate of air injection used in the method of the invention does not disturb the soil or the water, although some water turbulence may be created which helps mixing.

Increased levels of dissolved oxygen in the groundwater have been measured up to twenty feet from a well with sufficiently increased levels, about five mg per liter, to increase biological action measured to at least ten feet from the well. Thus, it has been found effective to place wells 10, 11, 12, and 13 on about fifteen-foot centers, i.e., fifteen feet apart. This ensures that the effectively increased oxygen is provided throughout the area of contamination. Since it is preferred to use a relatively low rate of flow of air into the wells to reduce the chance of channeling and increase the spread of such air throughout the area of contamination, and because such wells are preferably placed on fifteen-foot centers, it will not be unusual to have 150 to 200 injection wells located in a contaminated area to be remediated. An injection air manifold 14 supplies injection air to injection wells 10–13 from compressor 15.

It has been found that nutrients injected into the soil can be effectively batch injected at intervals of several weeks to several months, preferably about once a month, and that the nutrients will spread farther from a well in the soil and groundwater than does the oxygen injected into the water. Thus, only every other well, such as wells 10 and 12, need to provide for nutrient injection.

To provide a reduced pressure in the area of the contamination to promote the extraction of gas and volatile vapors from the area, a plurality of extraction wells 16 are provided in the contaminated area to withdraw such gas and vapors from the area. These will usually be interspersed between injection wells 10–13 and are connected through extraction header 18 to extraction blower 19 to help induce flow of the injected air and nutrients throughout the contaminated area. The extraction wells 16 can be either vertical wells or horizontal wells, vertical wells being shown in FIG. 1. Generally, it is desirable to withdraw between two and ten times the volume of gas and vapor from the contaminated area than is injected into the area. Further, it has been found that injection of air should be into the groundwater, injection of nutrients should be into the soil above the groundwater, and extraction of the air and vapor should be from the soil above the groundwater, i.e., in the vadose zone, the zone between the surface and the top of the high water table. There should be no extraction of groundwater. Further, to promote extraction of air and vapor from the contaminated area, it has been found important to seal the surface of the earth above the contaminated area 5 to reduce the amount of surface air drawn into the soil in the contaminated area. Air allowed to enter the soil through the surface short circuits the remediation process and reduces the effectiveness of the air extraction and remediation process. In the gasoline station example in FIG. 1, the area over the contaminated area 5 is already sealed with the concrete fuel dispensing island 8 and either a concrete or asphalt skirt around the island. Concrete skirts should be used because the concrete is generally impervious to gasoline spilled thereon, such as when an automobile is overfilled and gasoline runs out onto the skirt. Such spilled gasoline can penetrate asphalt and add to or, once the contaminated area is remediated, recontaminate the area.

Figure 2:
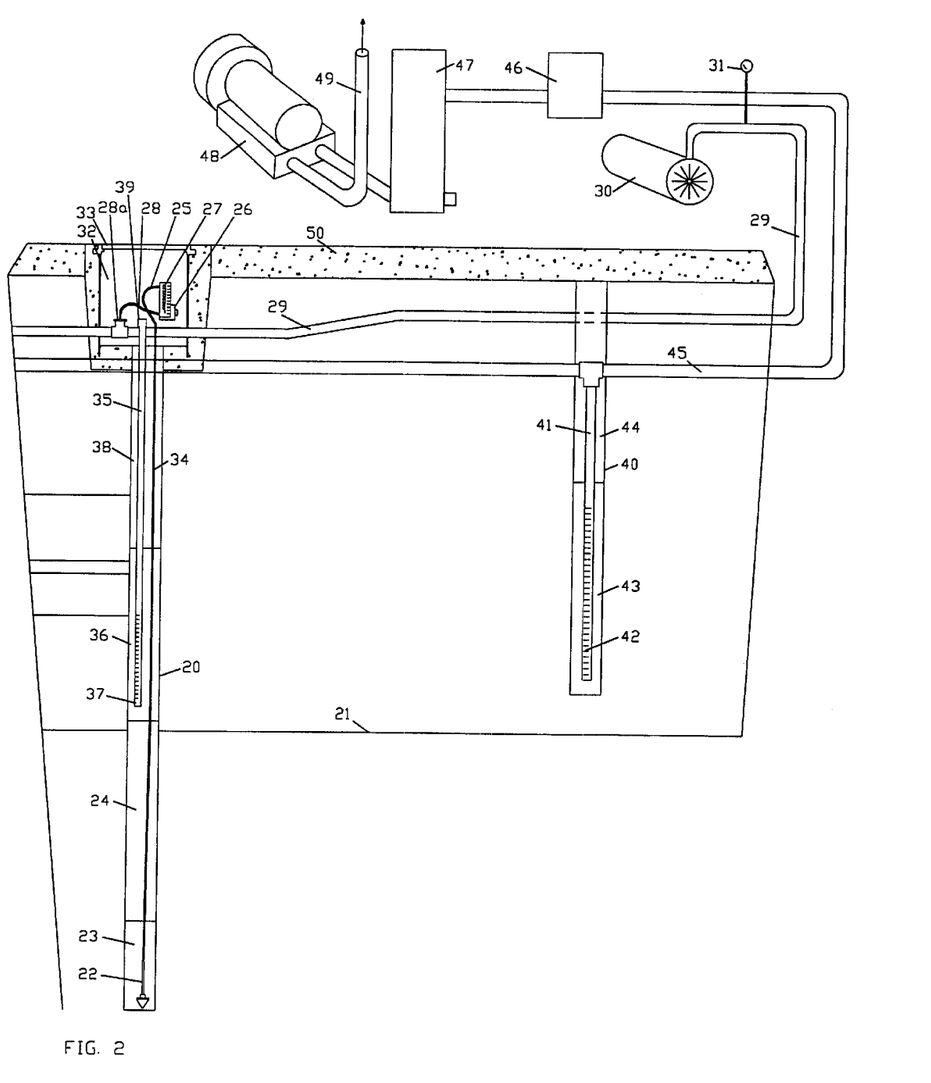
FIG. 2, a schematic showing of an injection well of the invention and a vertical extraction well of the invention.

FIG. 2 shows details of an injection well and vertical extraction well found satisfactory for use in the method of the invention. The bore 20 for the injection well is formed by any known manner satisfactory for the site concerned. Conventional drilling methods or push methods can be used as appropriate for the site concerned. The bore extends below the top of the water table 21 into the groundwater at least about four feet. An air injection conduit 34 extends down the bore 20 and has a perforated end portion 22 extending along the conduit for about six inches. The perforations may be in the form of holes or slots. This is where the air forced through the air injection conduit exits the conduit and is injected into the groundwater. The bore is filled with sand 23 around the perforated portion and upwardly for about six inches, providing a sand depth of about one foot. Air from the air injection conduit passes through the sand 23 into the groundwater. A plug 24, such as formed by bentonite clay, is placed around the air injection conduit above sand 23 and extends to the top of the water table. This keeps the air from the air injection conduit from merely flowing up the bore and forces it out into the groundwater. It has been found that the plug 24 should extend downwardly at least about three feet below the top 21 of the water table so that the top of the sand area where air flows into the groundwater is at least about three feet below the top 21 of the water table. It has also been found that the air injection is most effective between about three and ten feet into the water and preferably between about three and five feet. The preferred depth can vary with soil type with lesser depth in course soil and deeper depth in fine soil. However, the three to five feet works well in all soil conditions.

In order to monitor the progress of success of the remediation, a plurality of monitor wells 19 are positioned within and without the contaminated area. Samples of groundwater are periodically taken from these monitor wells and tested to determine hydrocarbon content. Remediation is continued until the samples from the monitor wells show that all or an acceptable amount of hydrocarbon contamination has been removed. This may take anywhere from around six months to over a year. This is a shorter period, however, than with prior art systems which often take two to four years.

In areas where the water table periodically goes up and down, such as with the seasons or with other variables such as nearby periodic pumping of the groundwater, injection wells of different depths may be provided or an injection well with two air injection conduits extending to different depths and with separate injection sand zones 23 for each air injection conduit separated by a plug of length of at least about three feet may be provided. The particular well or air injection conduit used will then depend upon the level of the water table at the particular time.

The top of the air injection conduit 34 is connected through check valve 25 to prevent back flow of air, air flow regulator 26, and air flow meter 27 to an air supply line 28 through connector 28a extending from an injection air supply manifold 29, corresponding to air injection manifold 14 in FIG. 1, providing air from air compressor 30 to a plurality of air injection wells. The compressor may be a rotary vane compressor. A pressure gauge 31 indicates air pressure in the manifold 29. The top of air injection conduit 21, check valve 25, regulator 26, and flow meter 27 are usually located in a recessed well top, concrete lined area 32 with top cover 33, such as a manhole cover, which provides protection to these items. However, depending upon location of the well, these items could be located above the ground surface. Also, injection air supply manifold 29 is buried, usually about one foot deep, so it is out of the way and protected, but depending upon the location of the contaminated area, may be run above ground. The injection air supply manifold will usually take the form of plastic piping.

A nutrient injection conduit 35 extends down bore 20 and ends above the top 21 of the water table. The end portion 36 of the nutrient injection conduit 35 is perforated, such as with slots, to allow nutrient to flow therethrough. The perforated end portion may extend upwardly for about four feet from the end of the conduit, if the depth of the well will allow it. Sand 37 fills the bore around the perforated portion and for about six inches above the perforated portion. A plug 38, such as of bentonite clay, extends from the top of the well downwardly at least about thirty inches to ensure that nutrient injected through the nutrient injection conduit flows outwardly into the soil rather than merely upwardly along the well bore. It has been found that the nutrient spreads better into the contamination area if injected into the soil above the groundwater rather than directly into the groundwater with the injected air. The nutrient then flows through the soil and into the groundwater and is spread through the contaminated area by the groundwater flow as well as through the soil by the air and vapor flow. The top of nutrient injection conduit 35 may be capped as at 39 in well access area 32 so it can be manually opened to allow an operator to pour liquid nutrient in batches into the conduit from where it can then flow out into the soil above the water table. Alternately, the top of the nutrient injection conduit can be connected to a nutrient supply tube which can supply nutrient to the conduit either on a batch or continuous basis from any appropriate source of supply.

The bore 40 for the extraction well is also formed in any satisfactory manner, and extends from the surface downwardly toward the top of the water table, but not into the groundwater. An extraction conduit 41, which may be one to two-inch PVC pipe, extends into the bore and has a perforated end portion 42. The perforations may extend upwardly from the end of the conduit for about five feet. Sand 43 is placed into the bore around the perforated end portion of extraction conduit 42 and for about six inches above the perforations. A plug 44, such as of bentonite clay, seals the top at least about thirty inches of the bore. The top of the extraction conduit is connected to a vacuum manifold 45 connected to a plurality of extraction conduits and through a filter 46 to remove any particulates that may be present in the extracted air and vapor stream and a self-emptying water knock-out device 47, to a regenerative blower 48 which creates a partial vacuum in manifold 45 to draw air and vapor from extraction conduit 41. The vacuum manifold 45 is preferably buried similarly to, or with, the air supply manifold 29 and may similarly be plastic pipe. Extracted air and vapor exit blower 48 through conduit 49 and may be directed to a processing unit to extract contaminant vapors, or, if appropriate, may be exhausted to the atmosphere.

To complete the preparation for practice of the method of the invention, the surface of the ground over the contaminated area is sealed such as by a layer 50 of asphalt, concrete, or other material, such as a layer of sheet plastic. Depending upon the site being remediated, a layer of asphalt or concrete may already cover a portion of the area, such as where the remediation site is a gas station with a hard surfaced entrance, skirts, and parking lot as in FIG. 1.

Rather than a vertical extraction well as just described, a horizontal extraction well could be used.

Figure 3:
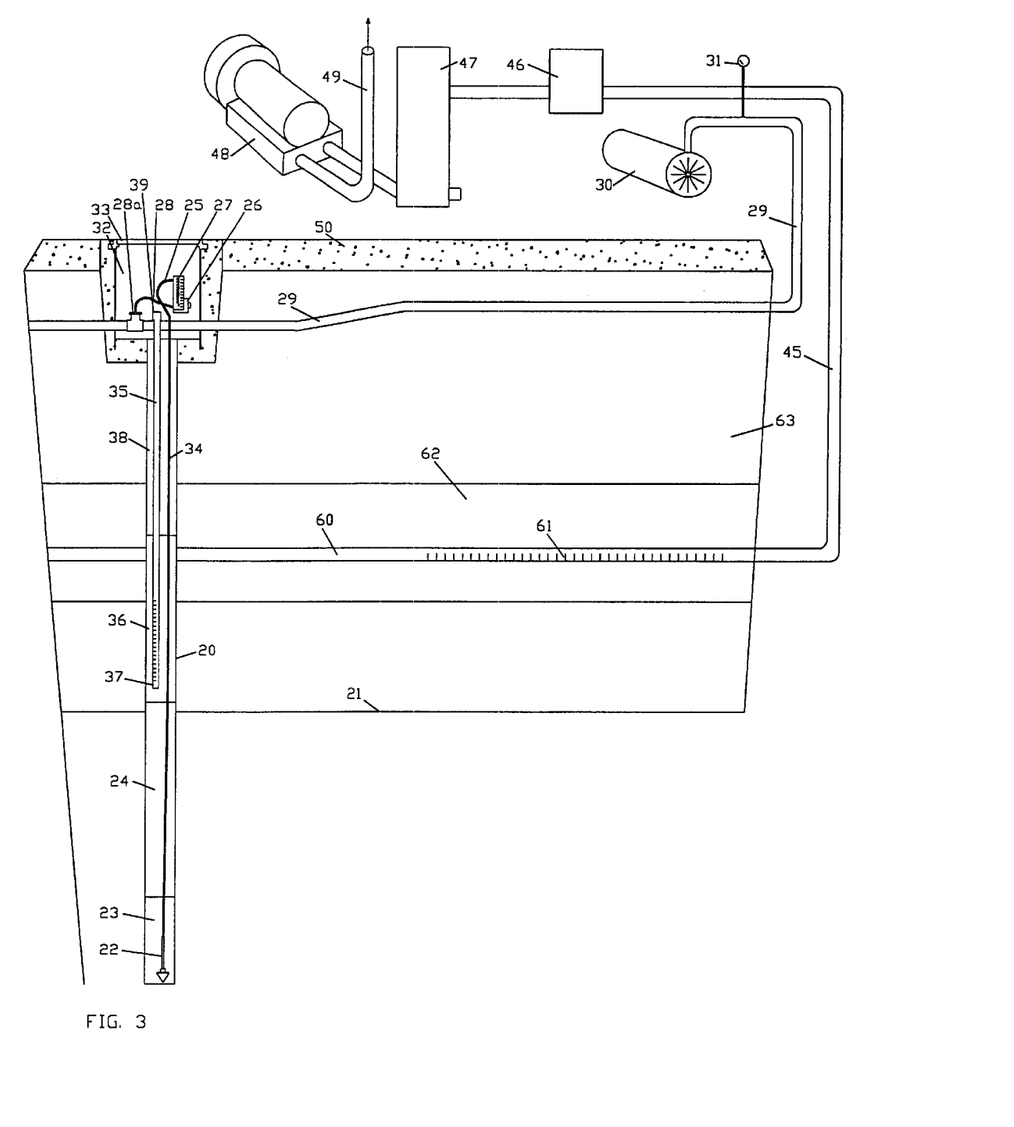
FIG. 3, a view similar to that of FIG. 2, but showing a horizontal extraction well in place of the vertical extraction well.

Thus, as shown in FIG. 3, an extraction conduit 60 having perforated sections 61 is buried in a generally horizontal orientation through, or generally above, the contaminated area. This is generally installed by digging a trench in or near the contaminated area, laying the extraction conduit 60 with perforated portions 61 in the trench surrounded with pea gravel and/or sand 62, and back-filling the upper portion 63 of the trench with earth, road fill, or other material. The top surface of the trench is sealed along with the surface of the rest of the earth over the contaminated area. The end of the conduit is connected to extraction manifold 45 as previously described to create a partial vacuum in the extraction conduit. The sand 62 should extend for at least several inches, preferably about six inches, around the conduit, or at least above the conduit with at least some sand or gravel below the conduit.

The use of vertical extraction wells is currently preferred, but generally cannot be used if the top 21 of the water table is within five to six feet of the surface. In such instances, there is no room for a vertical well. The horizontal extraction conduit will generally be buried about three feet below the surface of the ground and will be configured with periodic perforated portions 61.

Figure 4:
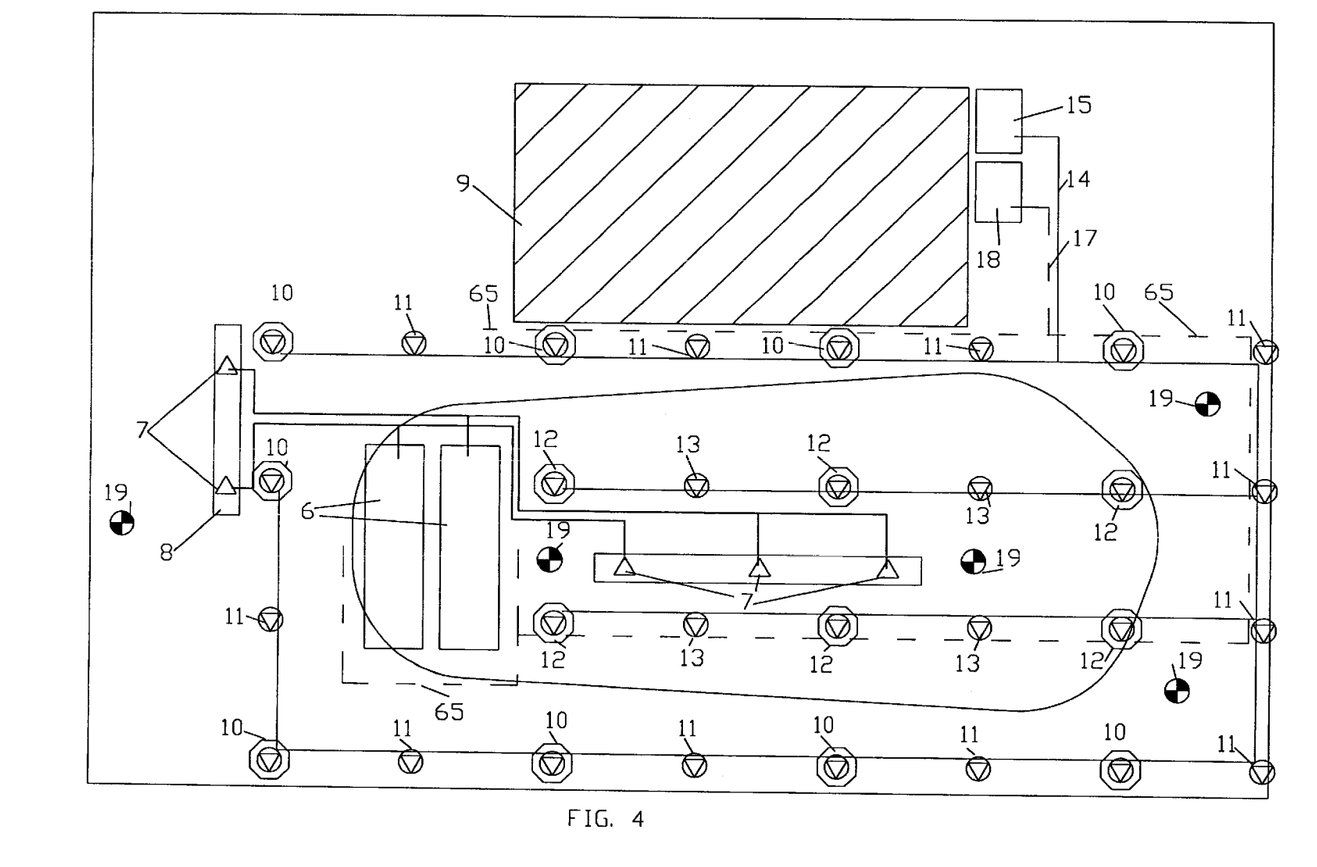
FIG. 4, a view similar to that of FIG. 1, but showing placement of horizontal extraction wells rather than vertical extraction wells.

FIG. 4 shows the layout of FIG. 1 but with horizontal extraction wells rather than vertical extraction wells. The horizontal extraction conduit 65 extends around and through contaminated area 5 from extraction manifold 17. Extraction conduit 65 can be laid in the same trench as the injection manifold 14, but will generally be about two or more feet deeper, i.e., usually about three feet deep. In some areas, such as around the storage tanks 6, it will extend beyond the injection manifold 14.

Generally, the extraction conduit 65 will be positioned so that it is within two wells of all injection wells. Thus, as shown in FIG. 4, the extraction conduit parallels two of the four extensions of the injection manifold so that no well is more than two wells away from an extraction conduit.

When laid so as to be adjacent injection wells as shown in FIG. 4, the extraction conduit is perforated in about five-foot lengths between adjacent wells and is kept unperforated as it passes the location of a well. This will help to draw vapor and air through the soil. The reduced pressure has no effect on the air in the groundwater.

With the system described, it has been found that a one and one-half horsepower rotary vane compressor can supply about 25 injection wells with one-quarter inch plastic tubing extending from the injection manifold 29 to the well in the form of air supply line 28 and air injector conduit 34. Up to eighteen wells can be supplied with a one horsepower compressor. With more wells, additional compressors can be used as needed. The various gauges, meters, and regulators are used in normal fashion to indicated and control air flow into the wells.

The nutrient currently preferred for use with the invention is a nitrate, such as ammonium nitrate, which is readily available and inexpensive. The nitrate is injected by pouring a liquid nitrate solution into the nutrient injection conduit so that it can run into the soil surrounding the well. The nutrient used is calculated based upon the particular contaminants to be cleaned up, the contaminant concentration, the soil and groundwater characteristics, and possible other relevant variables. Injection of the nitrate once a month has been found satisfactory in most cases, however, the information from the monitor wells on a continuing basis provides information as to when additional nitrate or other nutrient should be added.

Where chlorinated contaminants such as brake fluids and cleaning fluids are found in the area to be remediated, iron filings can be added with or as a nutrient to cause release of the chlorine.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

What is claimed is:

1. A method of remediating a site of earth and groundwater contamination comprising the steps of:
    drilling at least one injection well into the underground water in the contaminated area;
    placing at least one extraction conduit into the earth above the water in the contaminated area;
    sealing the surface of the earth above the contaminated area and above the extraction conduit;
    injecting nutrient through the injection well into the contaminated area;
    injecting air through the injection well into the contaminated area; and
    creating a vacuum in the extraction conduit to withdraw gas and vapor from the earth in the contaminated area wherein between about two and ten times the volume of vapor and air is extracted through the extraction conduit than the volume of air injected through the injection well.

2. A method of remediation according to claim 1, additionally including the step of installing an air injection conduit having a perforated end portion in the at least one injection well so that the perforated end portion extends greater than three feet into the groundwater so that air injected is injected into the groundwater and installing a plug in the well around the air injection conduit above the perforated end portion of the air injection conduit, said air injection conduit being one-quarter inch diameter plastic tubing.

3. A method of remediating a site of earth and groundwater contamination comprising the steps of:
    drilling at least one injection well into the underground water in the contaminated area;
    installing an air injection conduit in the at least one injection well extending into the groundwater;
    installing a nutrient injection conduit in at least one of the at least one injection wells terminating above the groundwater;
    placing at least one extraction conduit into the earth above the water in the contaminated area;
    sealing the surface of the earth above the contaminated area and above the extraction conduit;
    injecting nutrient through the nutrient injection conduit into the earth above the groundwater in the contaminated area;
    injecting air through the injection conduit into the underground water in the contaminated area; and
    creating a vacuum in the extraction conduit to withdraw gas and vapor from the earth in the contaminated area.

4. A method of remediation according to claim 3, wherein the at least one extraction conduit is installed vertically.

5. A method of remediation according to claim 3, wherein the at least one extraction conduit is installed horizontally.

6. A method of remediation according to claim 5, wherein the air injection conduit has a perforated end portion which extends greater than three feet into the groundwater and a plug is positioned in the well around the air injection conduit above the perforated end portion.

7. A method of remediation according to claim 6, wherein the perforated end portion of the air injection conduit extends between three and five feet into the ground water.

8. A method of remediation according to claim 3, wherein the step of drilling at least one injection well into the underground water includes drilling a plurality of injection wells into the underground water spaced throughout the contaminated area.

9. A method of remediating a site of earth and groundwater contamination comprising the steps of:
    drilling at least one injection well into the underground water in the contaminated area;
    placing at least one extraction conduit into the earth above the water in the contaminated area;
    sealing the surface of the earth above the contaminated area and above the extraction conduit;
    installing an air injection conduit with a perforated end portion in the at least one injection well extending into the groundwater so that the perforated end portion extends greater than three feet into the ground water;
    installing a plug in the well around the air injection conduit above the perforated end portion;
    installing a nutrient injection conduit in at least one of the at least one injection wells terminating above the groundwater;
    injecting nutrient through the injection well into the earth in the contaminated area above the groundwater;
    injecting between five and forty cubic feet of air an hour through the at least one injection well into the groundwater in the contaminated area; and
    creating a vacuum in the extraction conduit to withdraw gas and vapor from the earth in the contaminated area.

10. A method of remediation according to claim 9, wherein the step of injecting air into the contaminated area is the step of injecting between twenty and forty cubic feet of air per hour through each injection well into the groundwater.

11. A method of remediation according to claim 9, wherein the step of injecting nutrient into the contaminated area is the step of periodically injecting nitrate solution into each of the nutrient injection conduits.

12. A method of remediation according to claim 9, wherein the step of drilling at least one injection well into the underground water includes drilling a plurality of injection wells into the underground water spaced throughout the contaminated area.

13. A method of remediation according to claim 12, wherein the plurality of injection wells spaced throughout the contaminated area are spaced on fifteen foot centers.

14. A method of remediation according to claim 13, wherein nutrient is injected in less than the entire plurality of injection wells.

15. A method of remediation according to claim 12, wherein the at least one extraction conduit is a plurality of extraction conduits interspersed between selected injection wells.

16. A method of remediation according to claim 15, wherein the plurality of extraction conduits is a plurality of vertically placed extraction conduits.

17. A method of remediation according to claim 15, wherein the plurality of extraction conduits is a plurality of connected horizontally placed extraction conduits.

18. A method of remediation according to claim 17, wherein the plurality of extraction conduits have spaced perforated areas.

19. A method of remediating a site of earth and groundwater contamination comprising the steps of:
    drilling a plurality of injection wells into the underground water spaced throughout the contaminated area;
    placing at least one extraction conduit into the earth above the water in the contaminated area;
    sealing the surface of the earth above the contaminated area and above the extraction conduit;
    injecting nutrient through the injection well into the contaminated area;
    injecting between five and forty cubic feet per hour of air through each injection well into the groundwater in the contaminated area; and
    creating a vacuum in the extraction conduit to withdraw gas and vapor from the earth in the contaminated area.

20. A method of remediation according to claim 19, wherein the at least one extraction conduit is a plurality of extraction conduits interspersed between selected injection wells.

21. A method of remediating a site of earth and groundwater contamination comprising the steps of:
    drilling at least one injection well into the underground water in the contaminated area;
    placing at least one extraction conduit into the earth above the water in the contaminated area;
    sealing the surface of the earth above the contaminated area and above the extraction conduit;
    injecting nutrient through the injection well into the contaminated area;
    injecting air through the at least one injection well into the contaminated area at a rate of between five and forty cubic feet per hour; and
    creating a vacuum in the extraction conduit to withdraw gas and vapor from the earth in the contaminated area.

22. A method of remediating a site of earth and groundwater contamination comprising the steps of:
    drilling at least one injection well into the underground water in the contaminated area;
    placing at least one extraction conduit into the earth above the water in the contaminated area;
    sealing the surface of the earth above the contaminated area and above the extraction conduit;
    injecting nutrient through the injection well into the earth above the underground water in the contaminated area;
    injecting air through the injection well into the underground water in the contaminated area; and
    creating a vacuum in the extraction conduit to withdraw gas and vapor from the earth in the contaminated area.

23. A method of remediation according to claim 22, additionally including the step of installing an air injection conduit in the at least one injection well extending into the groundwater so that air injected is injected into the groundwater and installing a nutrient injection conduit in at least one of the at least one injection wells terminating above the groundwater so that nutrient is injected into soil above the groundwater.

24. A method of remediation according to claim 22, additionally including the step of installing an air injection conduit having a perforated end portion in the at least one injection well so that the perforated end portion extends greater than three feet into the groundwater so that air injected is injected into the groundwater and installing a plug in the well around the air injection conduit above the perforated end portion of the air injection conduit and extending at least three feet into the ground water.

25. A method of remediation according to claim 24, wherein the air injection conduit is one-quarter inch diameter plastic tubing.

* * * * *

UNITED STATES PATENT AND TRADEMARK OFFICE
CERTIFICATE OF CORRECTION

PATENT NO. : 6,464,005 B1  
DATED : October 15, 2002  
INVENTOR(S) : Mark T. Ellis

It is certified that error appears in the above-identified patent and that said Letters Patent is hereby corrected as shown below:

Column 1,
After the period on line 40, insert Column 2, lines 12 through 51.

Column 6,
After line 29, insert the paragraph which begins on line 62 of Column 6 and extends through line 5 of Column 7.

Signed and Sealed this

Eighteenth Day of November, 2003

JAMES E. ROGAN
*Director of the United States Patent and Trademark Office*